April 21, 1931.  R. ROUSSEL  1,801,642
WATER HEATER
Filed May 15, 1929
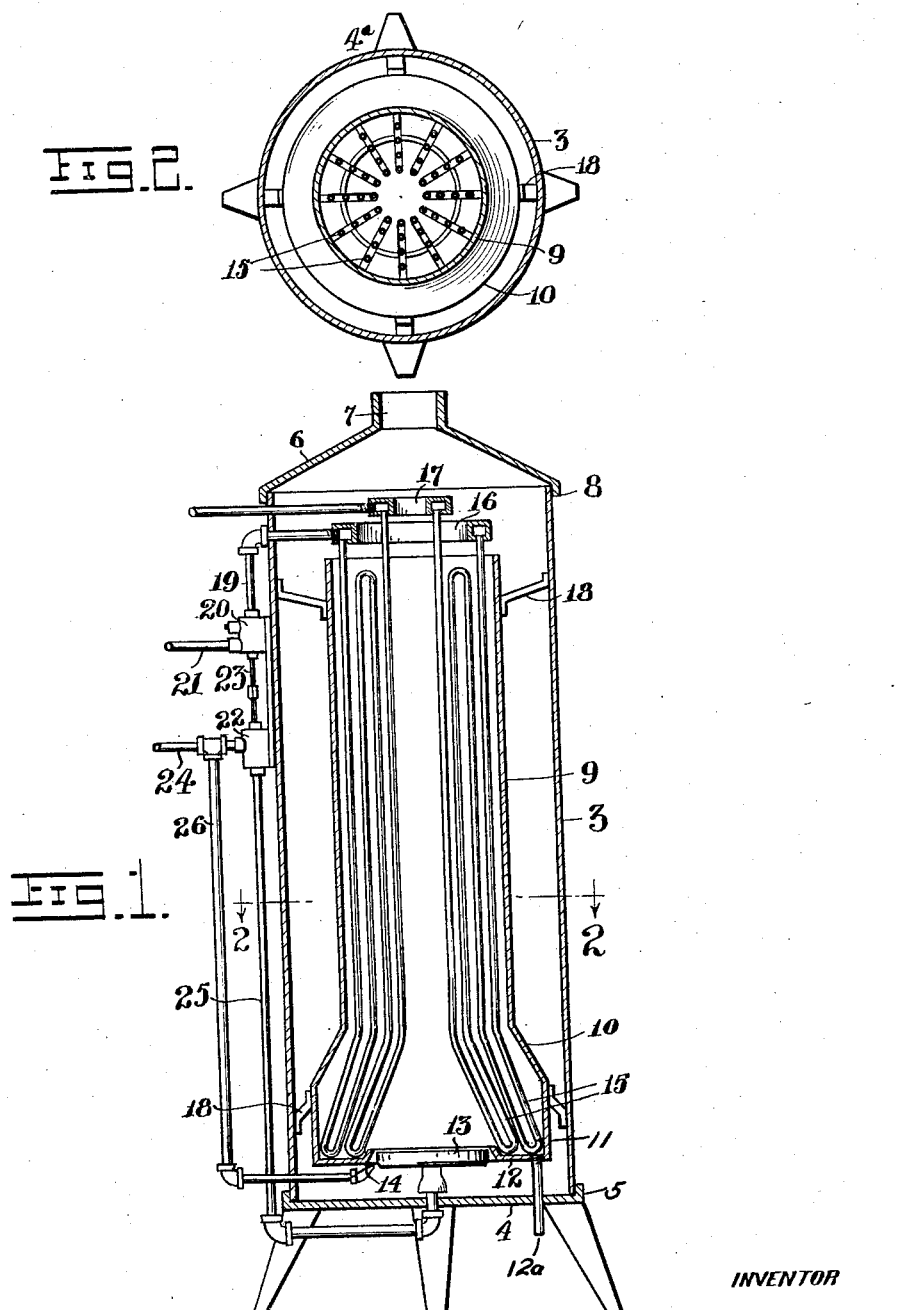

Patented Apr. 21, 1931

1,801,642

UNITED STATES PATENT OFFICE

RAOUL ROUSSEL, OF MONTREAL, QUEBEC, CANADA

WATER HEATER

Application filed May 15, 1929, Serial No. 363,253, and in Canada March 18, 1929.

My invention relates to water heaters and more especially to that type wherein the water is heated instantaneously as it is drawn from the heater.

The object of my invention is to obtain more heating surface without increasing the size of the heater itself.

A further object of my invention is to obtain a greater absorption of heat by the disposition of the coils.

In the accompanying drawings, forming part of the following description—

Figure 1 is a sectional elevation of a complete heater;

Figure 2 is a cross section on line 2—2, Figure 1.

The heater is composed of an outer casing 3 preferably of cylindrical form provided with a bottom 4 here shown as having a flange 5 in which casing 3 engages. The water heater 4 is mounted on legs 4ᵃ. The upper part of casing 3 is surmounted by a cover 6 having a flue outlet 7. The cover is also provided with a flange 8 engaging the top of the casing.

Inside casing 3 is a shield 9 opened at the top and flaring at the bottom as at 10. Below the flaring portion a vertical extension 11 is formed, terminating in a bottom 12 having an opening to receive a heating medium, in this instance shown as a gas burner 13. The edge of the opening in the bottom 12 is flared upwardly as at 14 to form a trough to permit the mounting of a series of coils 15. Each coil is connected to an intake manifold 16 and to an outlet manifold 17. In the present instance each coil is reversed twice and so mounted in shield 9 as to be radially positioned. Their lower part is flared or bent outwardly to correspond with the flare of the casing so as to allow the condensed moisture to fall in the trough and to be drained therefrom by a pipe 12ᵃ. This arrangement of the coils further forms a chamber for the burner.

The shield 9 is attached to casing 3 by means of brackets 18, as shown.

The intake manifold communicates with a water regulator by a pipe 19. The regulator 20 is connected to a water supply by a pipe 21. In order to control the heat in the heater, a fuel-regulating cylinder 22 is mounted adjacent the water cylinder 20 and interconnected by means of rods 23. The fuel is supplied to cylinder 22 by a pipe 24. A pipe 25 leads from the cylinder 22 to the burner 13 as shown. A pipe 26 is connected to pipe 24 and leads to a point adjacent the burner to act as a pilot. The regulating mechanism, composed of cylinders 20 and 22, forms the subject matter of a co-pending application and need not here be further described.

In operation the heater functions as follows: The water entering pipe 21 passes through regulator 20 into the intake manifold 16, from which it enters the series of coils 15 and as each of the coils is reversed twice, the water will circulate downwards, upwards, then downwards and again upwards to the outlet manifold 17 which is provided with an outlet pipe leading to the dispensing taps. The regulator 20 is connected to a fuel regulator 22 and they act simultaneously so that when hot water is drawn from the heater, a supply of fuel will be obtained for the burner 13 and the replaced water will be heated almost instantaneously. When thus heated, the regulator closes the fuel supply and the pilot light will act as a means to re-ignite the burner when fuel is supplied. It is well known that a certain amount of condensation takes place outside of the heating coils. To prevent this condensed moisture from dripping onto the burner, the pipes are bent outwardly and rest in the trough formed by the bottom 12 and flange 14, thus causing the dripping water to follow the pipes into the trough where it is drained by outlet 12ᵃ.

The above described heater is one well adapted for the purpose intended. It should be understood, however, that many changes could be made,—such as in the disposition of the coils, the form of the casing, and in the means of regulating the fuel,—without departing from the spirit of the invention as covered by the appended claims.

What I claim, is:—

1. In a heater of the class described, an outer casing closed at its ends, an outlet flue in the upper closure of said casing, an inner shield mounted inside of said casing, a flaring portion at the lower end of said shield, a vertical portion depending from said flaring portion, a horizontal portion integral with said vertical portion, an aperture in said horizontal portion, an upwardly flaring edge on said aperture so as to form a trough, a draining tube from said trough, a plurality of coils mounted to rest in said trough, said coils positioned vertically in said casing, a flaring portion at the lower end of said coils engaging said trough, and means at the upper end of said coils to connect the same to an inlet and an outlet manifold.

2. In a heater of the class described, a casing, a plurality of coils mounted vertically and disposed radially in said casing, the lower end of each coil being bent outwardly, an inlet manifold connected to one end of each coil, an outlet manifold positioned over said inlet manifold to which the other end of each coil is connected, a shield around said coils open at the top, a flaring portion at the lower end thereof, a bottom portion for said shield, an aperture in said bottom to receive a fuel burner, an upwardly flaring edge around said aperture to form a trough into which the coils rest, and means to drain the condensed water from the trough.

In testimony of the foregoing, I have hereto affixed my signature, this 10th day of May, 1929, at the city of Ottawa, Ontario, Canada.

RAOUL ROUSSEL.